Dec. 24, 1929.  M. P. WETMORE  1,740,848
REFRIGERATING UNIT FOR ATTACHMENT TO ICE BOXES
Filed April 6, 1928  4 Sheets-Sheet 1
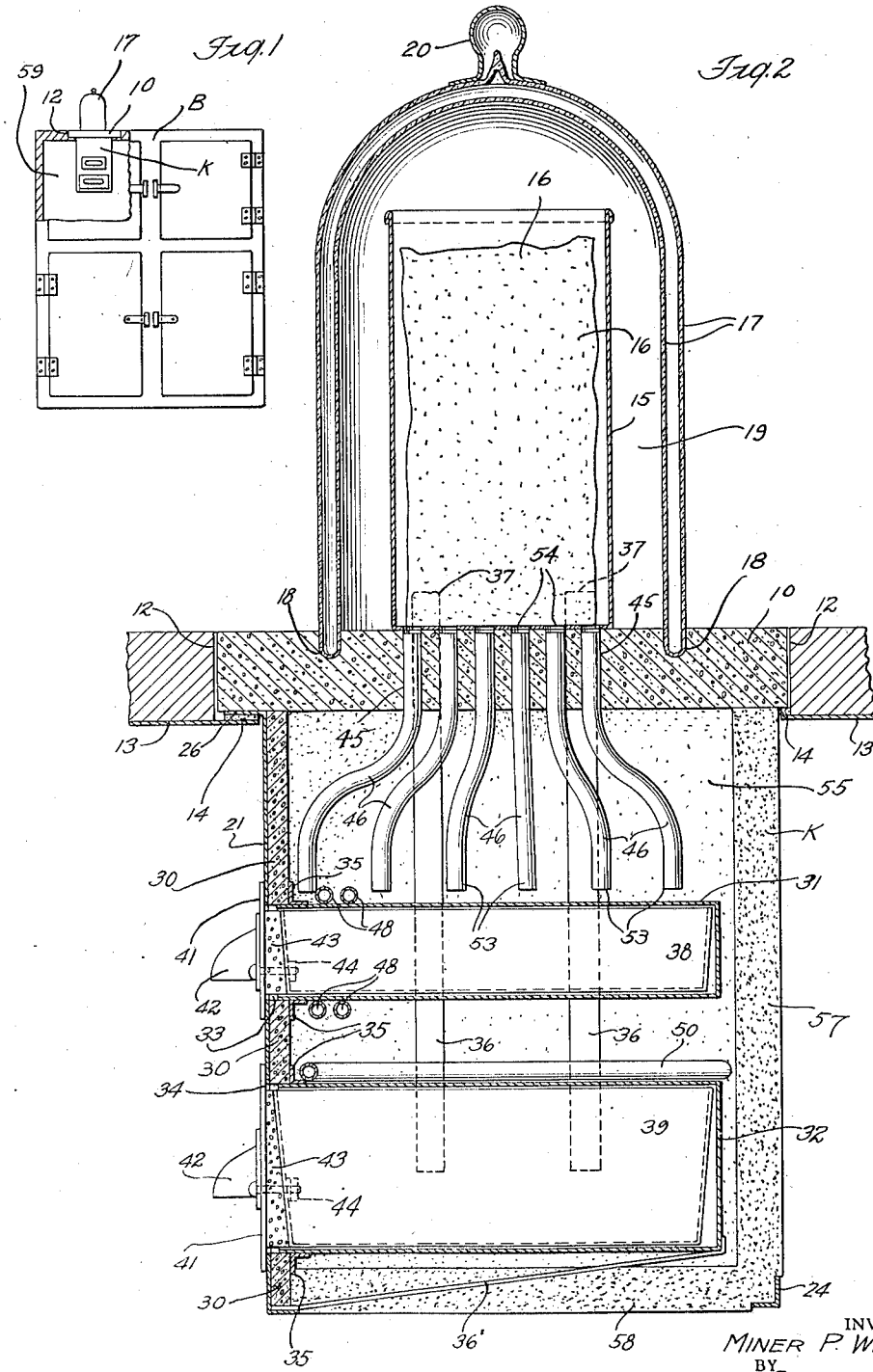
INVENTOR
MINER P. WETMORE
BY
Adolph A. Thomas ATTORNEY

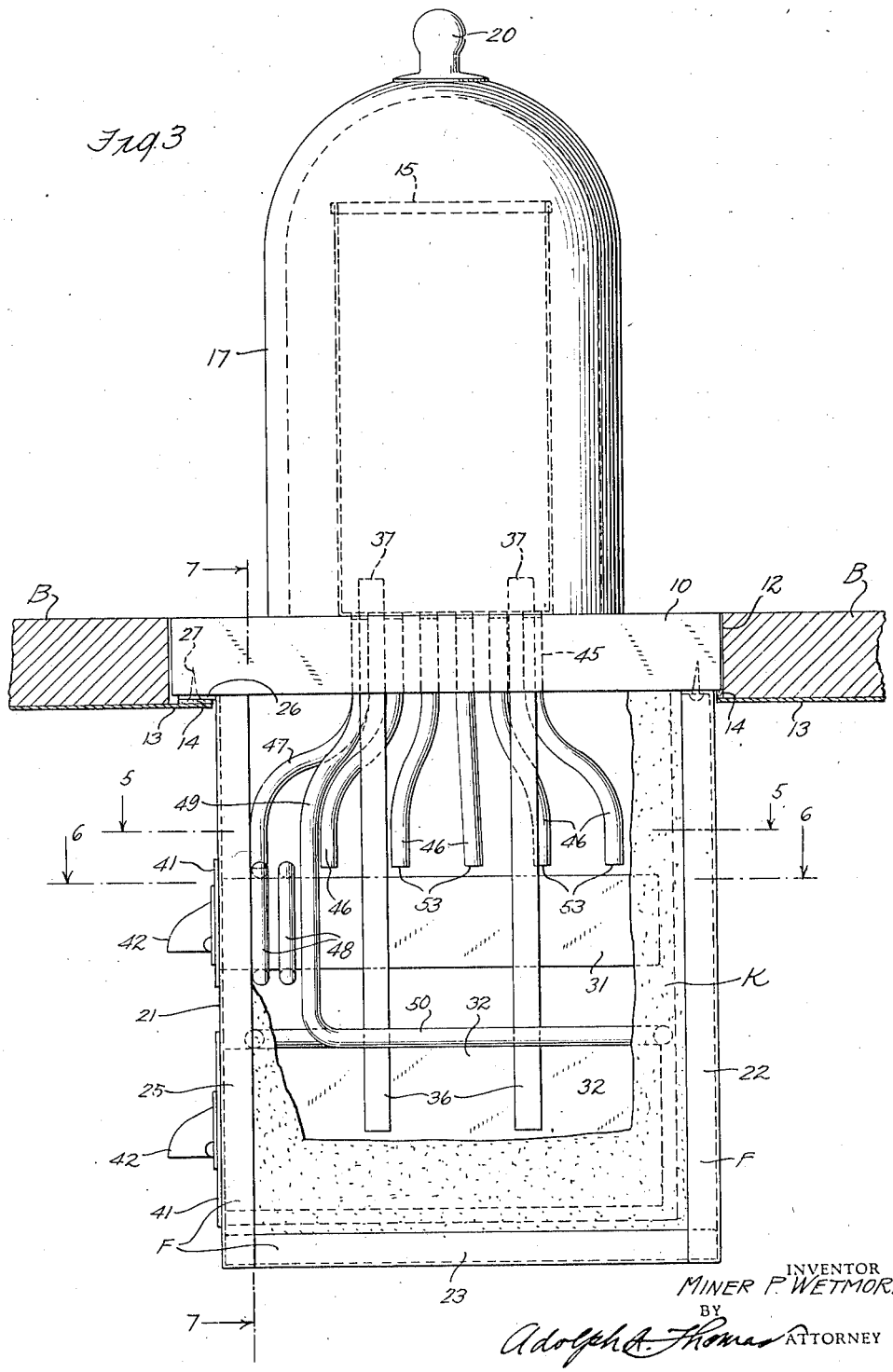

Dec. 24, 1929.                M. P. WETMORE                1,740,848
            REFRIGERATING UNIT FOR ATTACHMENT TO ICE BOXES
                     Filed April 6, 1928      4 Sheets-Sheet 3
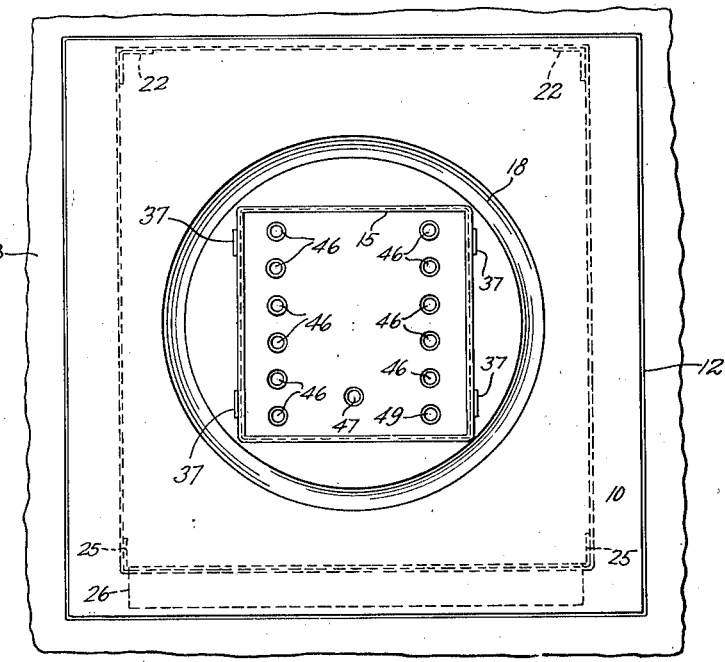
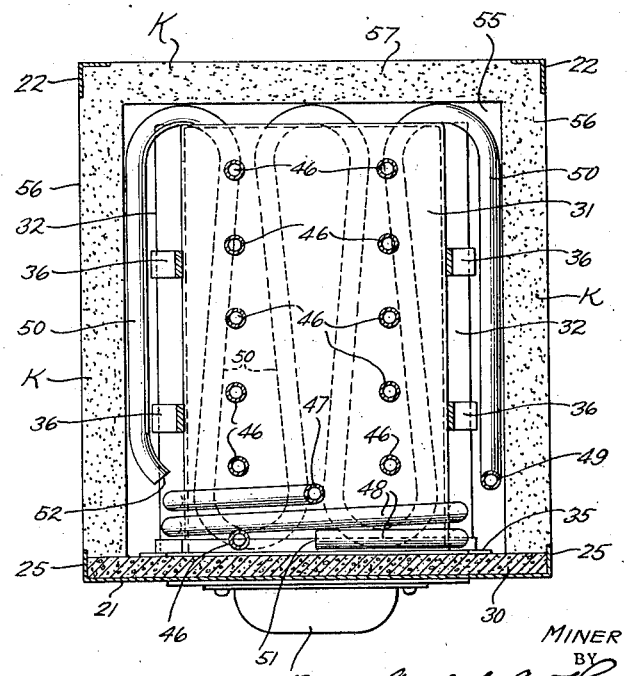
INVENTOR
MINER P. WETMORE
BY
Adolph A. Thames ATTORNEY Dec. 24, 1929.     M. P. WETMORE     1,740,848
REFRIGERATING UNIT FOR ATTACHMENT TO ICE BOXES
Filed April 6, 1928    4 Sheets-Sheet 4

INVENTOR
MINER P. WETMORE
BY
Adolph A. Thomas ATTORNEY

Patented Dec. 24, 1929

1,740,848

UNITED STATES PATENT OFFICE

MINER P. WETMORE, OF NORWICH, CONNECTICUT

REFRIGERATING UNIT FOR ATTACHMENT TO ICE BOXES

Application filed April 6, 1928. Serial No. 268,011.

My invention relates to the art of household refrigeration, and its object is to provide a self-contained refrigerating unit adapted to be readily attached to an ordinary icebox. This unit is simple and compact in construction, and its efficiency has been demonstrated by repeated tests. The source of refrigeration in this device is solidified carbon dioxide (known in the trade as dry ice), which is allowed to escape slowly amid expansion and consequent lowering of temperature. I use no moving parts and there is nothing to get out of order. To maintain the unit in operation, all that is necessary is to replenish at intervals the supply of dry ice.

Briefly stated, my new refrigerating unit in a preferred embodiment comprises a block of porous heat-insulated material containing one or more freezing chambers and a series of pipes connected to a dry-ice container. The outlet ends of these pipes are so distributed through the porous block that the refrigerating gas enters the block simultaneously at a number of spaced points. In this way, the entire block is subjected uniformly to the cooling action of the expanding gas, which gradually escapes through the pores or perforations of the block into the surrounding space. The porous block is either molded solid around the pipes and freezing chambers, or it may be a hollow block of heat-insulated walls enclosing the parts mentioned. The container for the supply of dry ice may have heat-insulated walls, or it may simply be a metal tank surrounded by a heat-insulated casing, which is preferably a double-walled vacuum jar inverted over the container and easily removed.

The self-contained refrigerating unit of my invention is readily attached to any icebox of accepted make by mounting the freezing block and dry-ice container on opposite sides of a base plate which fits into an opening in the top of the icebox. This base plate is of heat-insulated material and holds the block suspended in one of the top compartments of the ice box, while the container for the dry ice extends above the top for easy access. This permits replenishing the refrigerant without opening the ice box. When the unit is in place, the base plate is substantially flush with the top of the ice box and in effect forms a part thereof.

The practical advantages of my invention will be fully understood from a detailed description of the accompanying drawings, in which I have illustrated a refrigerating unit as actually constructed and successively operated. In these drawings, Fig. 1 shows an ice box equipped with my new refrigerating unit, this view being diagrammatic and on a greatly reduced scale;

Fig. 2 is a sectional side view of the unit on a larger scale;

Fig. 3 represents a side view with the enclosing block broken away to show the arrangement of cooling pipes;

Fig. 4 shows a plan view of the unit, with the vacuum jar around the dry-ice container removed;

Fig. 5 is a cross-section approximately on line 5—5 of Fig. 3;

Figure 6:
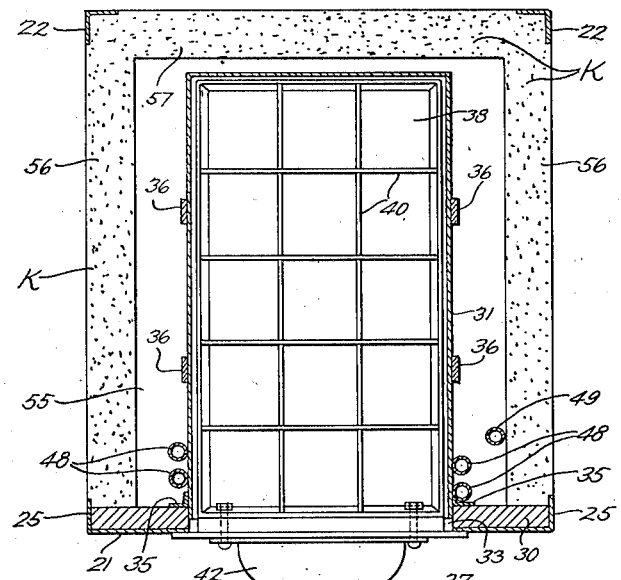
Fig. 6 is a cross-section on line 6—6 of Fig. 3.
Figure 7:
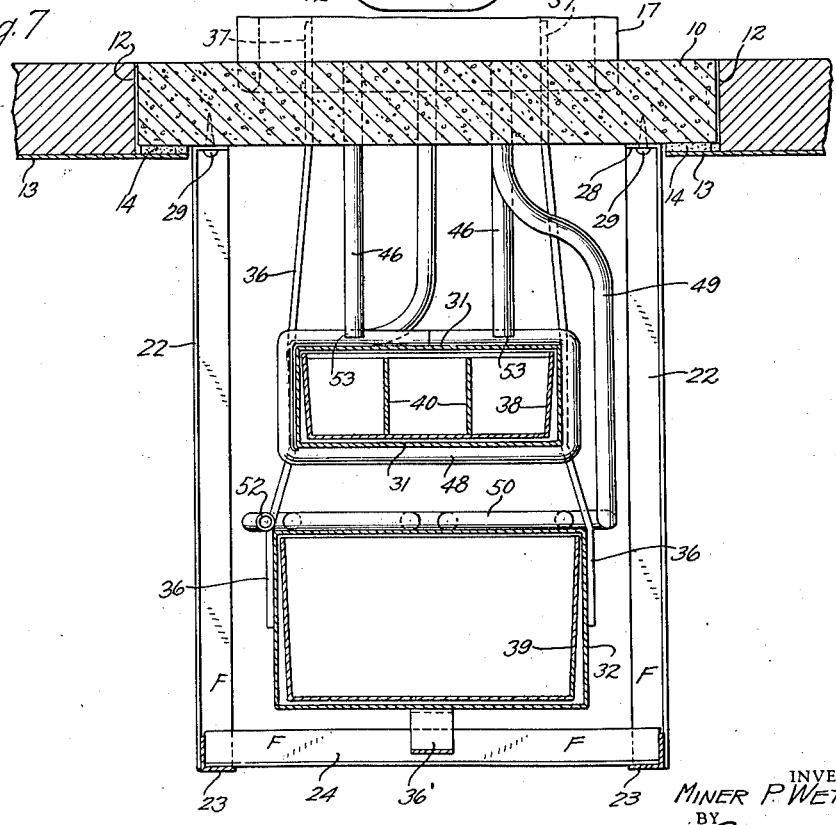
Fig. 7 represents a vertical section on line 7—7 of Fig. 3, showing a front view of the unit with the porous block omitted for clearness.

The refrigerating unit illustrated in the drawings is so designed as to be supported on top of an ice box, and for that purpose there is a base 10 made to fit snugly in an opening 12 cut in the top of an ice box B, which may be of any type available in the market. It is well known that ice boxes are lined inside with sheet metal, and I make use of this sheet metal lining to support the base 10 flush with the top of the ice box. As seen in Figs. 2, 3 and 7, the metal lining 13 projects under the base 10 and forms a supporting ledge or shoulder. If desired, a filler or pad 14 of asbestos or other heat-insulating material is placed between the base 10 and the supporting ledge 13. The base 10 may be of any practical heat-insulating material, but at the present time I prefer to make it of cork, which is not only light and strong, but permits metal parts to be readily secured thereto.

A suitable container 15 is mounted on base 10 for holding a supply of dry ice or other suitable refrigerant indicated diagrammatically at 16 in Fig. 2. If the container 15 is made of sheet metal, as it usually will be, it should be heat-insulated and closed against the outer air to prevent evaporation of the solidified carbon-dioxide. For this purpose I prefer to use a double-walled vacuum jar 17 mounted in inverted position on base 10. An annular groove 18 on the base receives the lower edge of the jar in a tight fit, so that the container 15 is surrounded by a heat-insulated air space 19. A knob 20 attached to the rounded top of the jar furnishes a grip for easy handling of the jar in removing and replacing it. If the jar is of considerable size, I prefer to have it of pyrex glass, or other material capable of withstanding ordinary usage. Of course, if desired, the container 15 may be constructed of heat-insulated walls and provided with a heat-insulated cover. The capacity of this container will depend upon the size and design of the unit as a whole. As a rule, a container having a capacity of five pounds of dry ice will be found sufficient for household use, since that supply will last about forty-eight hours.

To the underside of base 10 is attached a metal frame work indicated as a whole by F and consisting of a front plate 21, a pair of rear vertical strips or stays 22, a pair of side strips 23 connecting the front plate 21 with the rear strips 22, and a bottom cross-strip 24 connecting the two vertical strips 22. The plate 21 is formed with integral side flanges 25 and a top flange 26 extending forwardly in contact with the underside of base 10, as best shown in Figs. 2 and 3. Screws 27 or other fastening devices pass though flange 26 into base 10 to secure these parts together. The upright stays 22 are formed with lateral flanges 28 at the top for receiving screws 29 or other fastening means to attach the rear part of framework F to the underside of base 10. In this way, the skelton framework F is rigidly supported from the bottom of base 10, which may be said to form the top of the framework. The parts constituting the framework F are made of suitable sheet metal, such as so-called Monel metal (an alloy of copper and nickel), and the strips 22, 23 and 24 are preferably formed as angle pieces for greater stiffness, so that the entire framework can be made exceedingly light and strong. A heat-insulating sheet 30 of cork or other suitable material may be attached to the inner face of metal plate 21. While this insulation is not absolutely necessary, I have found it to be of advantage in the operation of the refrigerating unit.

Within the metal framework F are supported two metal cases or boxes 31 and 32. In larger units it is possible to use more than two cases to provide the desired number of freezing chambers. However, for the purpose of explaining my invention, I have shown two metal cases, with the understanding that the number may vary to suit the requirements of any particular design of unit. The metal cases or boxes 31 and 32 are supported horizontally one over the other in any practical way. As shown in Fig. 2, the front edges of boxes 31 and 32 extend into openings 33 and 34 in the insulating wall 30, and angle pieces 35 carried by the boxes hold them firmly in place. As a further means of supporting the cases or boxes 31 and 32 in framework F, I employ two pairs of brass strips 36, which are connected to the sides of the cases and extend through the base 10. The upper ends 37 of strips 36 are secured to the sides of container 15, whereby the latter is rigidly mounted on the base. The strips 36 are preferably brazed or soldered to the metal containers 15, 31 and 32, although they can be attached in any other suitable way. The strips 36 provide a very simple and convenient means for mounting the dry-ice container 15 on the base and rigidly supporting the boxes 31 and 32 in properly spaced relation. When the strips 36 are used, no fastening means are required for connecting the front of boxes 31 and 32 to the plate 21, it being only necessary that the boxes fit snugly into the openings 33 and 34. If desired, an additional strip 36' may be used for connecting the rear of case 32 with the bottom of front plate 21.

The metal cases 31 and 32 are adapted to receive trays or drawers 38 and 39 respectively, which are preferably formed of sheet metal. The upper drawer 38 is here shown as provided with partitions 40 for freezing ice cubes, and the lower tray or drawer 39 may be used for freezing confections. Each drawer is provided with a front plate 41 having a suitable handle or grip 42. If the plates 41 are of metal, it is advisable to insulate them from the drawers, as by means of cork pieces 43. Bolts 44 or other fastening devices connect the plates 41 and the interposed insulation 43 to the front walls of the drawers. The metal plate 21 has openings in alignment with the openings 33 and 34 in sheet 30 to permit insertion of the drawers 38 and 39 into their respective metal chambers 31 and 32.

The base 10 is provided with a number of holes 45 for receiving the upper ends of metal pipes to connect the bottom of container 15 with the space inside the framework F. In the present construction there are thirteen pipes mounted in base 10. Eleven of these pipes terminate slightly above the metal case 31 and are indicated by the reference numeral 46. A pipe 47 terminates in a coiled extension 48 surrounding the front portion of metal case 31. Another pipe 49 has a coiled extension 50 lying over the metal case 32 and preferably in contact therewith. The coiled extension 48 is open at 51, and the coiled extension 50 is open at 52. The pipes 46 are open at their discharge ends 53. These pipes fit so snugly in base 10 that they are firmly held therein by frictional contact without additional fastening means. The inherent resiliency of the cork makes a gas-tight joint around the pipes, which communicate with container 15 through holes 54 in the bottom thereof. The arrangement of pipes 46, 47 and 49 is best shown in Fig. 4, where it is seen that the pipes are arranged in two rows of six each, with one pipe in an intermediate position. I want it understood, however, that this particular arrangement of pipes, both as to spacing and number, is shown and described here by way of example and not as a restriction or limitation of my invention. As will appear later, the number, arrangement and shape of the pipes should be so selected in any particular design of unit so as to obtain the best possible distribution of the cooling gas conveyed by the pipes into the heat-insulated block mounted in framework F. Needless to say, the pipes 46, 47 and 49 should be made of good heat-conducting material, such as copper, and they need not be more than about ⅜ inch in diameter.

After the various parts above described have been assembled, the framework F is ready to receive a heat-insulated block K, which is either molded solid or is formed of walls providing a hollow chamber 55. The block is composed of material pervious to carbon dioxide gas, and by way of example I may mention cement, unglazed porcelain, wood pulp, emery, carborundum, granular compressed cork, solid cork with perforations, and other materials suitable for this purpose. In units which I have actually constructed in accordance with this invention and found highly satisfactory, I have used a mixture of cement and cinders to form the block K, this mixture being sufficiently porous to permit the diffusion of carbon dioxide gas through the block from which the gas gradually escapes into the surrounding space. If the block K is to be molded solid, a simple method is this: The framework is stood on end with the front plate 21 at the bottom. Two side boards and a back board are clamped in place and a mixture of cement and cinders is poured through the open top of the mold thus formed. The mixture fills all free spaces in the framework F, so that the metal cases 31 and 32 and the pipes 46, 47 and 49 are embedded in the porous mixture. After the mixture has hardened, the boards are removed, and the framework F now holds the heat insulated porous block K. To make this block hollow, the procedure is as follows: The frame F is laid on one side and the cement mixture is poured in until a wall of the desired thickness (say, one inch or so) has been formed. In this way the other walls are made until we finally have a whole block with side walls 56, rear wall 57 and bottom wall 58.

Whether the block K is solid or hollow, under either construction the pipes 46, 47 and 49, and the metal cases 31 and 32 are enclosed in a heat-insulated porous block. The cork lining 30 in effect forms the front wall of the heat-insulated block, and the base 10 forms the top thereof. In the broader aspect of my invention, it is not necessary that the entire outer surface of the block K should be pervious to the escape of carbon dioxide gas, for it is sufficient if the gas escapes through the bottom 58. For convenience I have referred to the block K as heat-insulated, both in the description and the claims, by which I mean that the block is made of a material capable of absorbing heat (i. e. cold) and retaining it for an appreciable time.

In the operation of the refrigerating unit above described, the dry ice or other solidified gaseous refrigerant in container 15 furnishes a continuous flow of carbon dioxide gas through the pipes 46, 47 and 49, through which the gas enters the block K simultaneously at a plurality of distributed points, whereby the cooling action of the gas is not only accelerated but also distributed through the block with substantially uniform effect. The gas that passes through pipes 46 enters the block K through the outlets 53 directly above the freezing chamber 31. The metal walls of this chamber distribute the cold rapidly around the chamber, so that the water in drawer 38 freezes in a short time. The coil 48 surrounding the front chamber 31 accelerates the lowering of the temperature in that chamber to the freezing point. In a unit that I have installed in an ice box and tested for some time, it takes about five hours to freeze the water in drawer 38. The coil 50 of pipe 49 exerts a direct cooling effect on the metal walls of the lower chamber 32, which is thus kept at a temperature sufficiently low for freezing confections in drawer 39, or maintaining confections in frozen condition. After the carbon dioxide gas issues out of the discharge openings of pipes 46, 47 and 49, its continued expansion through the porous block K maintains the block and the parts inside at a freezing temperature. The refrigerating gas slowly filters through the pores of the block and finally passes into the surrounding space where it produces a general cooling of the ice box.

I would call special attention to the function of the heat-insulated porous block K in continuing the cooling operation after the supply of refrigerant 16 has been exhausted. As previously explained, the carbon dioxide gas filters slowly through the pores of the block, which thereby becomes very cold, like a block of solid ice. Being of heat-insulating material, the block K retains the cold produced in its body by the expanding carbon dioxide gas, so that, even after the supply of dry ice is gone, a certain amount of gas still remains enclosed in the pores of perforations of the block from which it gradually passes into the surrounding space amid lowering of temperature. In this way, the gas-laden porous block K becomes itself a source of refrigeration capable of exerting a cooling effect for a considerable time after the container 15 is empty. It has been actually demonstrated that ice cubes can be kept frozen in the drawer 38 for at least twenty-four hours after the dry ice in container 15 is exhausted.

In an ice box which I have equipped with one of my refrigerating units, the average temperature in compartment 59 (see Fig. 1) was about 40° F., while the prevailing temperature in the other compartments of the ice box was about 50° F. These temperatures are lower than can be obtained by the use of ordinary ice in the old way. In an ice box of the household type, a supply of five pounds of dry ice will easily last two days. There is no danger of an undue accumulation of carbon dioxide gas in the ice box compartments, because these are so frequently opened that the gas escapes.

By mounting the container 15 outside the ice box, only the freezing block K takes up room in the ice box, so that a large block may be housed in an ordinary top compartment. However, the unit may be so constructed as to be enclosed completely in the ice box, leaving only a hole on top to fill the container with dry ice. While such a unit would occupy more space in the ice box, it would have the advantage of not projecting beyond the top and would therefore be invisible.

Although I have shown and described a specific construction, it is evident that the various features of my invention can be mechanically carried out in other ways than herein set forth. It is to be expected that in building refrigerating units in accordance with my invention, the skilled mechanic will probably resort to changes and modifications without departing from the scope of the invention as defined in the appended claims.

I claim as my invention:

1. The method of cooling a heat-insulated porous block of rigid material by introducing refrigerating gas into the block simultaneously at a plurality of distributed points, from which the gas permeates the block and gradually escapes through the pores thereof into the surrounding space.

2. A refrigerating unit comprising a heat-insulated block containing a plurality of pipes with their outlet ends distributed through the block, and means for connecting said pipes with a source of carbon dioxide gas, which is thereby introduced into said block simultaneously at a plurality of distributed points, said block being pervious to said gas for permitting diffusion thereof through the block and its final escape into the surrounding air.

3. Refrigerating apparatus comprising a heat-insulated block pervious to the passage of refrigerating gas, a container mounted on said block for holding a supply of dry ice, and a plurality of spaced open pipes connecting said container with the interior of said block for conveying carbon dioxide gas, the discharge ends of said pipes being distributed through the block.

4. A refrigerating unit comprising a heat-insulated block containing a plurality of pipes with their outlet ends distributed through the block, a heat-insulated container mounted on said block for holding a supply of dry ice, and means for connecting the bottom of said container with said pipes, whereby carbon dioxide gas enters the block through said pipes simultaneously at a plurality of distributed points, said block being pervious to said gas for permitting diffusion thereof through the block and its final escape into the surrounding air.

5. An ice box provided with an opening on top, a base member supported in said opening, a heat-insulated porous block attached to the underside of said base member and extending into a compartment of said ice box, a heat-insulated container mounted on said base for holding a supply of dry ice, and a plurality of pipes leading from the bottom of said container to distributed points in said block, said pipes providing passages for carbon dioxide gas which slowly filters through the porous block into the surrounding space for cooling the ice box compartments.

6. A refrigerating device adapted to be attached as a unit to ice boxes and the like, comprising a heat-insulated base adapted to be supported on top of an ice box, a heat-insulated block pervious to carbon dioxide gas attached to the underside of said base, a container mounted on said base for holding dry ice, a plurality of spaced open pipes fixed at their upper ends in said base and extending into said block, said pipes communicating with said container to convey carbon dioxide gas simultaneously to different outlet points in said block, and a heat-insulated casing removably supported on said base to cover said container.

7. Refrigerating apparatus comprising a heat-insulated block provided inside with a metal case which forms a freezing chamber, said block being constructed of material pervious to the passage of refrigerating gas, a container mounted on said block for holding a supply of dry ice, and a plurality of spaced open pipes connecting said container with the interior of said block for conveying carbon dioxide gas, the discharge ends of said pipes being distributed through the block, one of said pipes having a coiled extension arranged in contact with or very close to said metal case to increase the cooling effect of the gas in said freezing chamber.

8. Refrigerating apparatus comprising a heat-insulated block provided inside with two metal cases arranged one above the other and adapted to form freezing chambers, said block being pervious to the passage of refrigerating gas, a plurality of spaced open pipes extending into said block and having discharge ends distributed through the block for conveying refrigerating gas, one pipe having a coiled extension surrounding the front portion of the upper case, another pipe having a coiled extension lying over the lower case, the other pipes terminating above the upper case at distributed points, and means for connecting the inlet ends of said pipes with a source of solidified refrigerating gas.

9. A refrigerating device adapted to be attached as a unit to ice boxes and the like, comprising a heat-insulated base adapted to be supported on top of an ice box, a heat-insulated block pervious to refrigerating gas attached to the underside of said base so as to extend into the ice box, a metal case supported in said block to form a freezing chamber, a container mounted on said base for holding a supply of solidified refrigerating gas, a plurality of spaced open pipes fixed at their upper ends in said base and extending into said block, said pipes being open to the bottom of said container to convey refrigerating gas simultaneously to different points in said block, one of said pipes having a coiled extension arranged to contact with or very close to said metal case to increase the cooling effect of the gas in said freezing chamber, and a heat-insulated casing removably supported on said base to cover said container.

10. A refrigerating device adapted to be attached as a unit to ice boxes and the like, comprising a heat-insulated base adapted to be supported on top of an ice box, a heat-insulated block pervious to the passage of refrigerating gas attached to the underside of said base so as to extend into the ice box, a pair of metal cases supported one above the other in said block and adapted to form freezing chambers open at the front, a removable cover for each freezing chamber, a container mounted on said base for holding a supply of refrigerating gas, a plurality of spaced open pipes fixed at their upper ends in said base and extending into said block, said pipes being open to the bottom of said container to convey refrigerating gas simultaneously to different points in said block, one of said pipes having a coiled extension surrounding the front portion of the upper case, another pipe having a coiled extension lying over the lower case, the other pipes terminating above the upper case at distributed points, and a heat-insulated casing removably mounted on said base to cover said container.

11. A refrigerating unit comprising a rigid block pervious to the passage of refrigerating gas, said block being capable of absorbing and retaining cold, and means for thermally connecting said block at a plurality of distributed points with a chamber adapted to contain solid carbon dioxide, so that the refrigerating gas enters the block simultaneously at a number of different points to effect substantially uniform cooling thereof.

12. A refrigerating unit comprising a heat-insulated block containing a plurality of pipes with their outlet ends distributed through the block, means for connecting said pipes with a source of carbon dioxide gas, which is thereby introduced into said block simultaneously at a plurality of distributed points, said block being pervious to said gas for permitting diffusion thereof through the block and its final escape into the surrounding air, and a drawer removably supported in said block, said pipes being so arranged as not to interfere with the drawer.

13. The method of cooling a heat-insulated porous block by utilizing carbon dioxide gas derived from solid carbon dioxide, which method comprises introducing said carbon dioxide gas into the block simultaneously at a plurality of distributed points from which the gas permeates the block and gradually escapes through the pores thereof into the surrounding space.

MINER P. WETMORE.